F. A. SEIBERLING.
FABRIC FORMING APPARATUS.
APPLICATION FILED MAR. 11, 1918.
1,309,424.
Patented July 8, 1919.
4 SHEETS—SHEET 1.
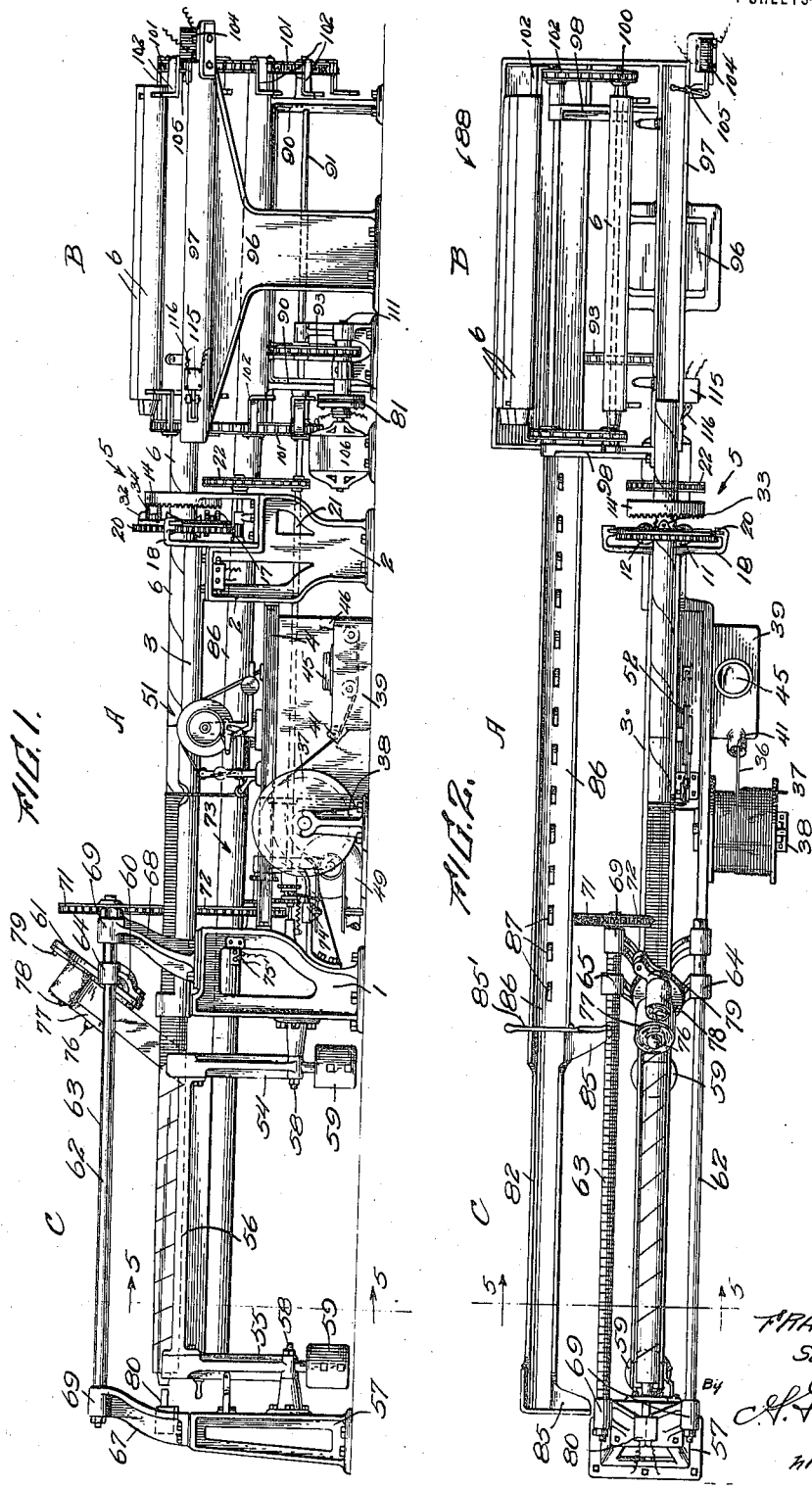

F. A. SEIBERLING.
FABRIC FORMING APPARATUS.
APPLICATION FILED MAR. 11, 1918.
1,309,424.
Patented July 8, 1919.
4 SHEETS—SHEET 2.
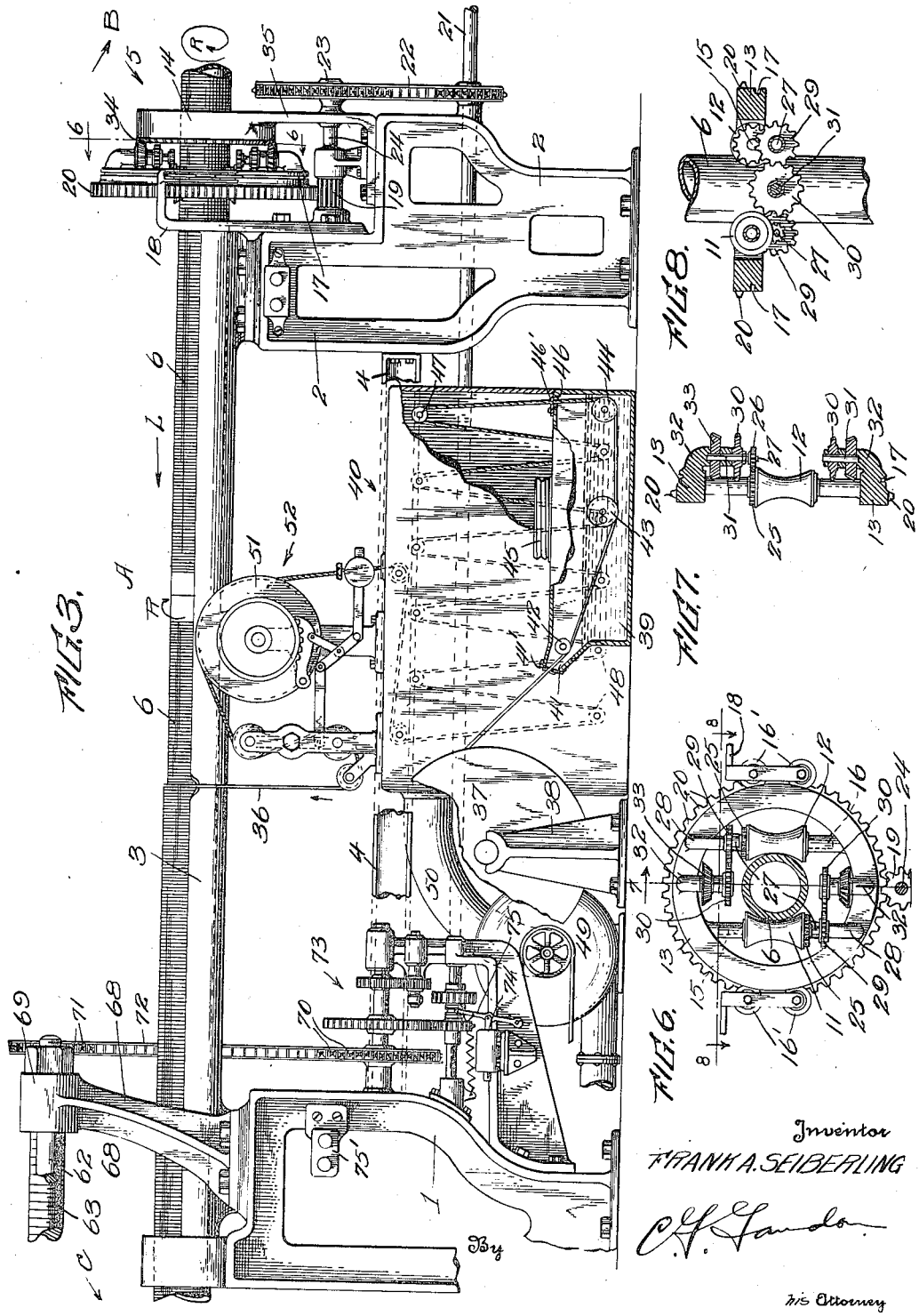
Inventor
FRANK A. SEIBERLING

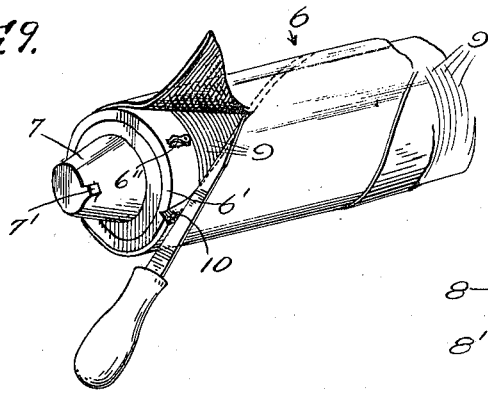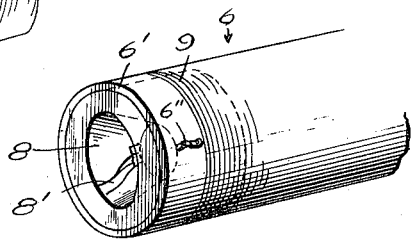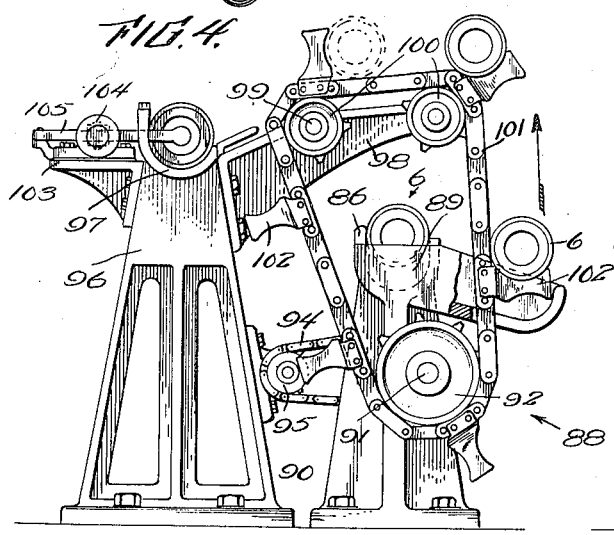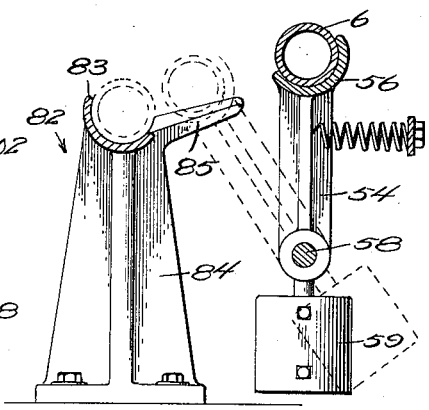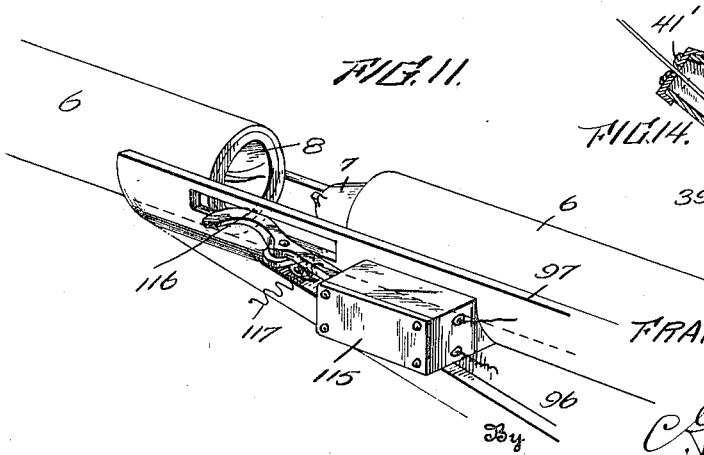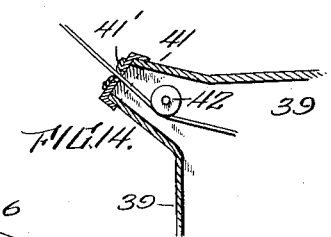

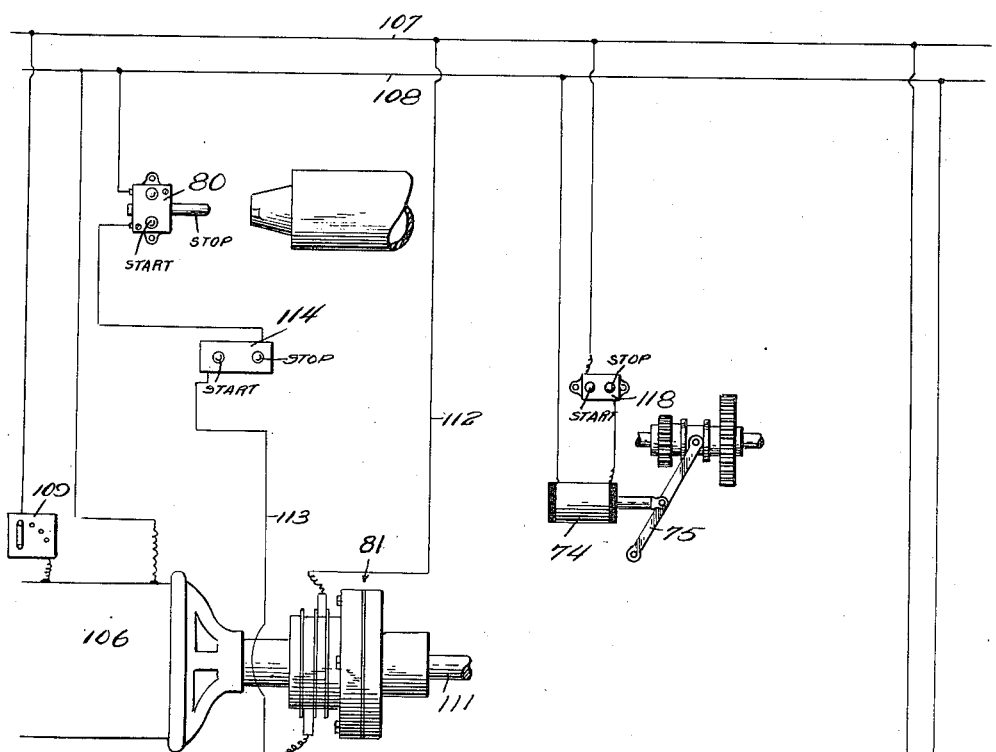
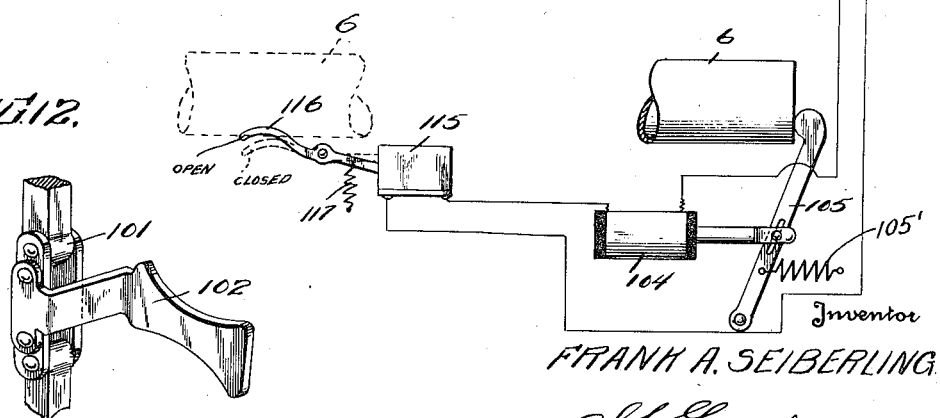

UNITED STATES PATENT OFFICE.

FRANK A. SEIBERLING, OF AKRON, OHIO, ASSIGNOR TO THE GOODYEAR TIRE & RUBBER COMPANY, OF AKRON, OHIO, A CORPORATION OF OHIO.

FABRIC-FORMING APPARATUS.

1,309,424.   Specification of Letters Patent.   Patented July 8, 1919.

Application filed March 11, 1918. Serial No. 221,758.

*To all whom it may concern:*

Be it known that I, FRANK A. SEIBERLING, a citizen of the United States, residing at Akron, in the county of Summit and State of Ohio, have invented new and useful Improvements in Fabric-Forming Apparatus, of which the following is a specification.

This invention relates broadly to cord tire building apparatuses, but has more particular reference to an improved mechanism for treating a single fabric cord in such manner as to produce fabricated sheets of a size, shape and nature suitable for immediate incorporation into a pneumatic tire carcass.

There are at present in general use two well known types of cord pneumatic tires. These two types are constructed by widely differing methods.

One type is generally built with two plies of heavy cords or so-called cables, these cords being impregnated with rubber before they are brought to the machine by which they are laid in place to form a tire carcass. When brought to the machine the cords are mechanically wound back and forth across the surface of the core on which the tire is built, being looped at each end of the core over a series of hooks or the like. Thus, in this type of cord tire, the plies forming the carcass are immediately built up or fabricated on the core itself.

In the other type of cord tire, the fabric cords, which are later to form the tire carcass, are woven as a complete fabric sheet on a loom, before being cut up and brought to the tire building machine in strips or plies of the proper length and width. Such a sheet of cord fabric is formed with a number of parallel weft cords, which are generally smaller, (in diameter), than the cords in the first mentioned type of cord tire. The weft cords of this second mentioned type of tire are held in proper relation, to each other, to form the fabric sheet, by means of very light warp or filler threads, which are of such slight strength that while they hold the larger cords in place during the building of the tire carcass, they break either during the vulcanizing process when the tire is cured or during the first few miles the tire is run in service on an automobile.

This second mentioned type of fabric, after being woven, is passed through what is known as a "spreader", which acts to impregnate the cord with rubber. It is then cut on the bias into strips, which are then wound around the core and shaped thereto either by hand or by what are known as stitchers in a carcass building machine.

It will thus be noted that while the two methods of building cord tires are similar in the respect that under each method the cords are rubberized before they are brought to the tire building machine for making the carcass, they are dissimilar in the respect that, whereas, under the first method the woven cords are brought to the tire building machine and then woven into ply form on the core itself, under the second method the cords are laid up to form the fabric ply before they are brought to the core and, instead of being woven back and forth on the core and looped over hooks or the equivalent at the beads, are stitched down in the same manner that the ordinary ply of fabric is stitched down to build a tire carcass.

Each of these methods or systems of building cord tires has its merits, but each is open to objection from the standpoint of economical manufacture.

Each method requires that the cords be rubberized and then transferred to the tire building machine. This use of separate elements to prepare the fabric and build the tire and the handling of the material between the two elements are costly factors in production.

The first system eliminates some of the costs of the second system, such as the weaving of the cord fabric in the loom, and the cutting up of this fabric on the bias cutter, but it introduces further factors of cost which counterbalance the saving which it makes, notably through the fact that the machines by which the single cords are woven into ply form upon the core itself, have a relatively small capacity since they operate at very slow speed as compared to the speed with which the other type of machines can be employed to stitch down plies of cord which have already been fabricated into ply form by the light cross or warp thread.

The second system, speeding up, as it does, the production of tire carcasses on the tire building machines themselves, is, however, as stated, open to objection that considerable cost attaches to the weaving of the fabric on the loom and the subsequent transfer of this fabric to the spreader for impregnating the fabric with rubber and the bias cutting to obtain the ply width and length strips required to build the carcass.

Being cognizant of the foregoing conditions in the art, I have had in mind as the principal object of my invention, the production of a machine which is of such a character that a spool of cord may be placed at one point in the machine and the cord fed through the machine and subjected during such feeding to the action of coördinated mechanical means which will first impregnate the cord with rubber, then wind the cord upon a drum, then apply a skim coat of rubber to the covering of cords formed upon the drum, then cut this covering of rubberized and coated cords on the bias into plies of the width required for building a tire carcass, the cut being so made that the cord extends diagonally across the ply in the desired manner.

This system obviously embraces the marked advantage of taking the cord from the spool and passing it through the machine in such a manner that it emerges therefrom a complete fabric strip or ply, ready for immediate application to the core in the tire building machine. This system eliminates the necessity of handling the fabric between the loom and the spreader; it eliminates the use of a spreader; it eliminates in the second of the mentioned tire building systems the necessity of weaving the fabric on a loom, (for no cross thread is necessary to hold the cords in proper parallel relation, due to the fact that the skim coat of rubber applied in this machine acts as a binder to hold the cords in proper relation); and it allows the plies of fabric to be rapidly laid up on the core by stitching process instead of requiring that the cords be slowly wound back and forth as under the first mentioned system.

Further, this system eliminates the waste of large quantities of benzin vapors, etc., usually experienced where a spreader is used to impregnate the fabric after weaving, since the construction of the cord impregnating means embodied in my apparatus is such that the cord is entirely inclosed until sufficiently dry for application, in a vacuum recovering chamber, wherein the solvent is recovered.

The above and additional objects of a similar nature, which will be hereinafter more specifically treated, may be accomplished by such means as are illustrated in the accompanying drawings, described in the following specification, and then more particularly pointed out in the claims which are appended hereto and form a part of this application.

With reference to the drawings, wherein there has been illustrated a preferred embodiment of the invention as it is reduced to practice, and throughout the several views of which, similar reference numbers designate corresponding parts:

Figure 1 is a front elevation of my proposed machine;

Fig. 2 is a top plan view thereof;

Fig. 3 is an enlarged elevation of the central portion A;

Fig. 4 is an end view of the reloading mechanism;

Fig. 5 is a section on the line 5—5 of Fig. 1, of the transferring cradle and stripping trough;

Fig. 6 is a sectional detail of the mandrel driving mechanism;

Fig. 7 is a sectional detail of the mandrel driving mechanism;

Fig. 8 is a sectional detail of the mandrel driving mechanism;

Fig. 9 is a perspective of the male portion of a mandrel and illustrating the manner of stripping the mandrels of their coverings;

Fig. 10 is a perspective view of the female portion of a mandrel;

Fig. 11 is a detailed perspective view of the trip switch of the mandrel locking mechanism;

Fig. 12 is a detailed perspective of the elevating chain and hooks;

Fig. 13 is the wiring diagram complete; and

Fig. 14 is a detail of flap valve at the mouth of the cement pot.

In carrying out the preferred form of my invention I have provided a central unit comprising a mandrel supporting structure, a mandrel driving mechanism, a cord impregnating, feeding and tensioning mechanism for supplying the cord to the mandrel; a second unit consisting of the mandrel collecting and feeding mechanism; and a third unit comprising the gum wrapping and the stripping mechanisms. In the drawings I have designated the central and end units as A, B and C respectively.

The supporting structure of the central unit A consists, (see Figs. 1 and 2), mainly of a pair of end standards 1 and 2, a semicircular cross bed or trough 3 and a suitable horizontal cross brace 4 connecting the standards. Mounted upon the standard 2 is the mandrel driving mechanism, designated, (as an entirety) by the numeral 5.

In its preferred embodiment each mandrel or mandrel section 6 is hollow for the major portion of its length but carries at each end an integral solid stud, one of which, indicated at 7, (see Fig. 9), is shaped to form the male member of a locking combination and the other end 8 of which is formed to constitute the female member of a locking combination.

The male members 7 of the mandrel or mandrel sections 6 consist of a cylindrical body portion adapted to be inserted into the end of the hollow cylindrical body portion 6' of another mandrel section 6 and secured in any suitable manner, as shrinking, or welding, or pinned and a reduced tapering end portion carrying at the outer edge a locking lug 7' later to be described.

The female members 8 of the mandrels 6, also consist of a cylindrical body portion and are secured into the portion 6' of mandrels 6 in the same manner. The body portion, however, has a conical bore corresponding in size and shape to the tapering end portion of the male members 7. An internal helical groove (see Fig. 10) 8' extending from the end of the bore out to a point adjacent the periphery of the member, and having its greatest depth at the end of the bore and vanishing to zero as it approaches the periphery, is provided to engage the locking lug 7' of the male member, thereby causing a cam action between the two members and securely locking them together.

On the surface of the body portion of the mandrel is a continuous shallow helical groove 9 of very light pitch. This groove receives the cord which is wound upon the mandrel during the operation of the machine, and as will be hereinafter fully described, materially facilitates proper placing and spacing of the convolutions of the cord and permits the winding of the cord at any desired pitch determined by the pitch of the groove. The body portion of the mandrel is also provided with an external groove 10, which is considerably deeper than the groove 9 and is of very heavy pitch. This groove is provided to permit the proper application of the cutting knife to the cords when the cord winding on the mandrel has been completed and is to be removed in sheet form.

A pair of cord fastening hooks 6'' are arranged adjacent the ends of each mandrel to secure the ends of the cord during the gum strip applying and mandrel transferring operations.

Before taking up a description of the driving mechanism by which the mandrels are rotated and simultaneously fed longitudinally through the trough 3 during the winding of the cord, it is to be explained that a constant supply of mandrels following one another end to end are fed to the driving mechanism by a mechanism and in a manner which will be herein later described under the heading "Mandrel collecting feeding mechanism:" and that the male and female locking studs of the successive mandrels are lockingly engaged whereby the mandrels are firmly joined as sections of a pole.

*Mandrel driving and rotating mechanism.*

The mandrels which are delivered to the driving mechanism 5, (which mechanism is, as illustrated, placed at the entrance end of the trough 3), are simultaneously rotated as a unit about their longitudinal axes and moved longitudinally through the trough 3 by direct contact with a pair of concaved bight rolls 11 and 12, (see Fig. 6). These bight rolls are journaled on parallel axes and spaced so that they may engage diametrical opposite points of the mandrel. The axles or shafts of the bight rolls are mounted in a revoluble power driven ring 13 in order that the rolls may simultaneously rotate as a group unit around the longitudinal axis of the mandrel and about their own parallel axes.

Specifically the mounting and driving mechanism of the bight rolls comprise the revoluble ring 13, a stationary rack tooth ring 14, and sets of gears and pinions by which the rolls are power driven about their own parallel axes and by which the ring 13, in which the rolls are mounted, is rotated about the mandrel as an axis. The bight rolls are supported upon axles 15 and 16, disposed in the position of parallel chords of the circle defined by the ring 13. The ring 13 is itself supported for rotation in a vertical plane by means of diametrically opposed sets of rolls 16' or disks which seat in a groove 17 formed in the ring, (see Figs. 2 and 6), and are mounted on the bracket 18.

The actuating means for the ring 13 comprise a pinion 19 which meshes with the gear teeth 20 formed on the periphery of the ring, and is driven from the main power shaft 21 through chain 22, sprocket 23 and shaft 24.

From the foregoing it will be apparent that the rotation of the ring 13 will cause the two rolls to rotate as a unit about the mandrel as an axis, thus causing the mandrel in turn to rotate about its own longitudinal axis.

In order that the mandrel may be moved longitudinally through the trough 3 at the same time it is being rotated, it is necessary that the rolls 11 and 12 be independently power driven, and for this purpose the axle of each roll is equipped with a pinion 25, (see Figs. 6 and 7). These pinions mesh with pinions 26 carried on axles 27 which are journaled in offset bearings 28 projecting from the ring 13. Each of the axles 27 carries a second pinion 29. These pinions mesh with pinions 30 carried terminally on stub shafts 31 which are journaled in the offset bearings 32 also carried by the ring 13. These stub shafts 31 carry intermediate their length beveled gears 33, which mesh with the rack teeth 34 formed on the stationary ring 14 (see Fig. 3). The stationary ring is supported in the required spaced parallel relation to the revoluble ring by a suitable bracket 35 bolted or otherwise secured upon the standard 2.

As will now be apparent, the rotation of the ring 13 will, through the engagement of the bevel gears 33 with the rack teeth of stationary ring 14 and the consequent actuation of the members 32, 31, 30, 29, 27, 26 and 25, cause the rotation of the bight rolls 11 and 12 about their own longitudinal axes.

Thus I have provided for the mandrel unit a direct driving mechanism of such nature that a single pair of bight rolls performs the two functions of rotating the mandrel about its longitudinal axis and simultaneously moving the mandrel forward longitudinally through the trough 3.

As each mandrel progresses through the trough 3, the cord 36 is wound about it, the separate convolutions of the cord being disposed in the convolutions of the groove or channel 9 as previously described.

*Cord cementing and tensioning apparatus.*

It is necessary that the cord, which is withdrawn from a supply spool 37 revolubly supported beneath the trough 3 by suitable bearing standards 38, be impregnated with rubber cement before being applied to the mandrel. To this end the central unit A is equipped with a cord cementing apparatus which consists broadly of a cement pot 39 and a drying chamber 40. The cement pot is preferably formed in the nature of a rectangular sheet metal casing having at its end adjacent to the supply spool 37 a cord inlet 41 provided with a flap valve 41′, wherein is disposed an idler roll 42. In actual use of the apparatus, a cord is drawn from the supply spool, passed through the inlet 41, under the idler roll 42, and then directed into the rubber cement contained in the pot and held submerged therein for the length of the pot by means of additional idler rolls 43 and 44, which are located below the level to which the cement is to be maintained. The cement is introduced into the pot through an opening covered by the screw cap 45 (see Fig. 3).

After the cord is passed through the cement bath, it is led out of the pot through the opening 46 provided with a wiper 46′ and then alternately passed over the rolls of the upper and lower horizontal series 47 and 48 mounted in the casing which constitutes the drying chamber 40. The cord is in this manner exposed, before it is applied to the mandrel, to the atmosphere to allow the fumes or gases produced by the solvent present in the rubber cement, to escape and be very largely drawn off by a vacuum pump 49, which communicates through a conduit 50 with the drying chamber (see Fig. 3).

The fumes or gases are conducted by the pump 49 to a condenser or equivalent and suitable recovering apparatus which is not illustrated (since its specific construction is not a feature of this invention) but is to be understood as constituting a part of the combination of elements of my invention.

*Tensioning device.*

After passing through the drying chamber, the cord is, as best illustrated in Fig. 3, led over the tension drum or roll 51 of a tension mechanism 52. The details of construction of the tension device constitute no feature of my present invention for any efficient device of this character may be employed without departing from or in any way effecting the use or scope of this invention. For the purposes of the present disclosure, I have, however, illustrated a tension device, the construction and operation of which will be readily understood upon reference to Fig. 3 of the drawings.

The cord passes from the tension device on to the mandrel which is moving through the trough 3 in the direction of the arrow "L" (Fig. 3) and is rotating in the direction of the arrow "R" (Fig. 3). This compound movement of the mandrel will, of course, result in the winding of the cord in the manner best illustrated in Fig. 3. The speeds of rotation and of longitudinal movement are so synchronized that the convolutions of the cord are caused to follow and seat in the convolutions of the groove or channel 9 which as previously explained is formed in the face of the mandrel.

A selective speed transmission (not shown) or a variable speed driving motor (not shown) are employed in connection with the main drive shaft in order that the operator may run the machine at that speed which will best insure the proper cementing of the cord before it passes on to the mandrel.

*Gum wrapping mechanism.*

As each mandrel exits from the trough 3 covered with a cemented cord winding, it passes in the gum wrapping unit C.

This unit consists essentially of a supporting cradle, and a carrier of the supply of sheet gum. The cradle comprises normally upright, oscillatable end frame members 54 and 55 and a trough 56 which extends between the upper ends of the members 54 and 55. The standard 1 and a similar standard 57, alined therewith, carry alined horizontal shafts 58 whereon are pivotally supported the members 54 and 55 as best seen in Fig. 1. Counter or balance weights 59 adjustably secured on the lower ends of the members 54 and 55 serve to normally maintain the cradle in upright position with the trough 56 in registry with the trough 3 and to return the trough 56 to this normal position after the cradle has been oscillated by the handles provided (in a manner to be later explained) to transfer the completely wrapped and skin-coated mandrel section to the mandrel stripping apparatus.

The carrier of the supply of sheet gum (which is preferably brought to the machine in the form of a roll) comprises a hanger 60, bearing an inclined plate 61, a pair of parallel supporting rails 62 and 63 and sleeves 64 and 65 which are movable on the rails and support the hanger.

The rails 62 and 63 are supported above the cradle by brackets 67 and 68 each of which has at its upper end a pair of spaced bearing sleeves 69, the corresponding sleeves 69 on the brackets 67 and 68 being alined in the required manner. The rail 62 is smooth throughout its length so that the sleeve 64 of the hanger may freely move thereon. The rail 63 is, however, externally screw threaded to form a driving screw and the sleeve 65 of the hanger is correspondingly internally threaded. The screw is driven from the main power shaft through sprockets 70 and 71 and the connecting chain 72. A reversing mechanism 73 is used to cause the return of the hanger to its initial position (which is the left hand side of the machine) after the finish of each wrapping operation. The reversing mechanism is controlled by a solenoid and shift arm as at 74 and 75 (Figs. 1 and 3) the solenoid being controlled by the operator through a suitable switch 75'.

From the plate 61 projects an axle 76 whereon is rotatably supported the roll of stock indicated at 77. Immediately above the stock roll a liner roll is supported upon an axle 78, which projects from a swinging arm 79 pivoted to the plate 61. The pivot of the arm is so located, as shown in Fig. 2, that the liner roll normally tends by gravity to remain in contact with the stock roll and wind up the liner of the gum sheet as the gum is dispensed.

It will be readily apparent upon reference to Figs. 1 and 2 that the driving of the screw 63 causes the hanger to move from the left to the right above the cradle and that the rotation of the mandrel, as this member progresses through the cradle, will cause the strip of gum to be pulled off the stock roll and wrapped helically about the mandrel.

*Stripping apparatus.*

The mandrel, after passing through the gum strip applying unit into the cradle engages a limit switch 80 located upon the standard and causes the main driving magnetic clutch 81 to deënergize and stop the mandrel to permit transferring to a stripping bench or table 82 to be next described.

The stripping bench or table 82 consists mainly of a horizontal trough 83, end standards 84, and a pair of unloading fins 85. The mandrel upon being transferred to the stripping bench is stripped of its fabric by the operator by means of a hand knife projected along the spiral groove 10 in the mandrel as in Fig. 9, after which a latch 85 is raised and the mandrel started down an inclined chute 86 to the automatic feeding mechanism designated as a whole as 88. Suitable rollers 87 are provided in the chute 86 to facilitate in the easy handling of the mandrels to the feeding mechanism 88.

*Mandrel feeding mechanism.*

The chute 86 terminates in an inclined receiving trough 89 supported on a pair of standards 90 and forms half of the unit B. A jack shaft 91 carrying at each end a sprocket 92, is mounted in the standards 90 in suitable bearings provided therefor and in a position just below the receiving trough 89 as clearly seen in Fig. 4. The jack shaft 91 is driven by a sprocket 93 keyed to it and a chain 94, connecting to a sprocket 95 carried on the main drive shaft 21.

A standard 96, positioned in alinement with the central standards 1 and 2, supports a bed or trough 97 similar in shape to the bed 3, forming the other half of the end unit B. A pair of brackets 98 bolted to the top of the standard 96 provide bearing support for a pair of idler shafts 99 carrying at their extremities sprockets 100. Endless chains 101 engage and mesh with the sprockets 100 and 92 and carry at set intervals mandrel lifting hooks 102. The hooks 102 are concaved on their upper and lower edges or engaging surfaces to better accommodate the mandrels as they are raised up over the outer sprocket 100 and also to catch them as they roll down the incline between the sprockets 100 and engage the hooks ahead as will be understood. The chains 101 are continually in operation and as the mandrels are released from the stripping bench 82 and successively slide down to the receiving bench 86, the hooks will lift them up to the trough 97 and deposit them therein.

Mounted on the top of the standard 96 on the opposite side from the brackets 98, is bolted another bracket 103 supporting a solenoid 104 directly connected to a lever 105 pivoted in a slot cut through the trough 97 for a purpose later to be described.

*Wiring diagram.*

In Fig. 13 I have illustrated, diagrammatically, a wiring system involved in facilitating the control of various parts of the machine. A motor 106, connected to the main circuits 107 and 108 and controlled by the starting box 109, carries at the outer end of its shaft one-half of a magnetic clutch unit 81. The other half is carried on the end of an auxiliary power shaft 111 coupled by a sprocket chain 94 and sprockets 93 and 95 to the main drive shaft 21. One side of the magnetic clutch unit carries the usual brushes and rings and is connected to one of the main power lines, as 107, by a wire 112. The other brush is connected to the main line 108 by a connection 113 and is interrupted by the main control switch 114 and the automatic limit switch 80.

Assuming the machine is ready to operate, the starting box 109 is operated, the main motor 106 started, throwing one-half of the magnetic clutch in motion. The operator presses the start button in the switch 114 energizing the clutch 81 and causing the shaft 111 and in turn the main shaft 21 to rotate. This continues until the stop button in the main switch 114 is pressed or one of the mandrels engages the limit switch 80 and breaks the circuit. In either case, both start buttons have to be in operating position before the clutch 81 can be energized again as will be understood.

The mandrel locking solenoid 104 is controlled by a spring pressed trip switch 115 secured in the opening in the bed 97 near its forward end. The lever 116 of the switch is normally held in a depressed or opened position by the mandrels 6 and when the end of the mandrel is reached, the expansion spring 117 forces the lever 116 outward and closes the circuit. This energizes the solenoid 104 and operates the lever 105 to engage the end of the mandrel that has just previously been deposited in the bed 97. The mandrel is forced ahead until the forward end engages the lever 116 and breaks the circuit to the solenoid. The movement of the lever 105 is sufficient to cause the male portion of the mandrel 6 to engage the female portion of the preceding mandrel and effect the lock. The solenoid 104 is directly connected to one of the main lines 107 from one terminal, the other terminal is connected to the main line 108 but is interrupted by the switch 115.

The solenoid controlled reversing mechanism 51 is operated through a switch 118 located at any convenient place on the standards 1, 2 or 57. The solenoid 74 is connected on one side direct to the main line 108 and the other side of said solenoid is connected to the switch 118 which is connected to the main line 107.

*Operation.*

Assuming the machine is equipped with the necessary cord, cement, etc., the operator will first thread the cord from the spool, through the cement pot up through the drying chamber, around the tension and attach it to one of the securing hooks 6' on the end of one of the mandrels 6. The mandrel is placed in rotation by manipulation of switch button 114 and the winding of the cord upon the mandrel commences. At this time the mandrel loading mechanism is also put in operation so that when the present mandrel is completely wound, another one will be in the proper position to be next covered with the cord.

When the mandrel is almost completely wound, the operator will attach the free end of the gum strip to the end of the mandrel, operate the switch 118 and throw the driving mechanism 73 into operation. This will cause the screw threaded rail 63 to slowly revolve causing the gum strip applying mechanism to travel in a direction opposite to that of the direction of the mandrel. As the mandrel is traveling forward at a predetermined speed and revolving at the same time, it will be apparent that as the gum strip applying mechanism travels in a reverse direction at a predetermined speed, the difference in the speeds will compensate for the width of the gum strip allowing sufficient lapping to completely cover the mandrel.

At the completion of the gum strip applying operation, the ends of the mandrel 6 engage the limit switch 80, causing the magnetic clutch 81 to be deënergized, thereby stopping the rotation of the main drive shaft 21. The operator then severs the cord at the junction of the two mandrels, fastening the ends around the securing hooks 6' as will be understood. The transferring cradle is then rocked, delivering the freshly covered mandrel into the stripping trough 83. The start button in the limit switch 80 is pressed again, throwing the main shaft 21 into rotation and the operation just described is repeated.

In the stripping trough, the mandrel is stripped of its covering by means of a knife inserted into the groove 10 by the operator. He will slowly revolve the mandrel with one hand and at the same time thrust the knife forward in the groove 10 with his other hand, and sever the cords and fabric. He will then grasp the severed fabric and strip it free of the mandrel and deposit it in any suitable stock take up or rolling table, as will be understood. The latch 85' is then raised and the mandrel given a start down the incline chute 86.

The anti-friction rollers 87 in the chute 86 will allow the mandrel to slowly slide down to the receiving trough 89 of the mandrel reloading mechanism. Here it is engaged by the hooks 102 on the elevating chain 101 and slowly raised up to a level just above the height of the trough 97 supported by the standard 96. The drive of the elevating chain 101 is so timed in respect to the main drive of the mandrels as to permit the preceding mandrel to be out of the trough 97 before the succeeding mandrel is allowed to drop into the trough. As the preceding mandrel leaves the trough 97, it trips the lever 116 of the trip switch 115 thereby closing the circuit to the mandrel locking solenoid 104 causing the solenoid to be energized and the free end of the lever 105 brought into engagement with the end of the mandrel just deposited into the trough 97. The lever 105 will cause the mandrel to be thrust forward causing the stud projecting from the forward end and forming the male element of the locking combination to enter into the female end of the preceding mandrel completing the lock. As the locking operation is completed, the forward end of the rear mandrel engages the trip arm 116 of the trip switch 115 and breaks the circuit again. The arm 105 will then be returned to its initial position by a spring 105′.

From the foregoing it will be apparent that I have produced a machine wherein a complete ply of fabric ready for application of a tire machine is built up by a simple and inexpensive process. Further, it will be observed that I have produced a machine that is easily operated by one operator, thereby doing away with the several intermediate steps necessary in the previous methods before described.

In using a single cord to build up a ply of fabric, it will be apparent that each of the threads of the finished ply will be thoroughly impregnated with rubber whereas in a sheet of previously woven fabric submitted to a bath, the closeness of the threads prohibits the rubber from penetrating the interstices, as will be understood.

Although I have illustrated and described the preferred form of my invention, I do not want to be limited to this particular construction and it will be understood that minor changes in the design and details may be made without departing from the scope of the appended claims.

What I claim is:

1. An apparatus of the character described, including a mandrel having on its surface a helical groove, a cord cementing apparatus adapted to cement a continuous length of cord as the same is drawn through the apparatus, and means for moving the mandrel in a longitudinal path past the cord cementing apparatus, and simultaneously rotating the mandrel about its own longitudinal axis to wind the cemented cord in the mandrel groove.

2. An apparatus of the character described, including a mandrel having on its surface a helical groove, a cord cementing apparatus, means for moving the mandrel in a longitudinal path past the cementing apparatus and simultaneously rotating the mandrel about its own longitudinal axis to wind the cemented cord in the mandrel groove; and means for maintaining the cord under tension as it is drawn through the cementing apparatus and wound about the mandrel through the rotation thereof.

3. An apparatus of the character described, including a mandrel having on its surface a helical groove, a mandrel rotating mechanism and a cementing apparatus for cementing a continuous length of cord, means for producing relative movement between said mandrel and cementing apparatus while rotating said mandrel, whereby a cord attached to the mandrel will be drawn from the cementing apparatus and wound helically upon the mandrel and in the groove thereof.

4. An apparatus of the character described, including a mandrel having on its surface a helical groove, a mandrel rotating mechanism, a cementing apparatus for cementing a continuous length of cord, means for producing relative movement between said mandrel and cementing apparatus while rotating said mandrel, whereby a cord attached to the mandrel will be drawn through the cementing apparatus and wound helically upon the mandrel and in the groove thereof; and means interposed between the mandrel and the cementing apparatus for maintaining the cord under tension as it is wound upon the mandrel.

5. An apparatus of the character described, including a cord cementing apparatus adapted to cement a continuous length of cord as it is drawn through the apparatus; a mandrel composed of a plurality of mandrel sections disjointedly connected at their abutting ends, a mandrel driving and rotating mechanism adapted to move successive mandrel sections past the cementing apparatus and to simultaneously rotate said connected mandrel sections about their own longitudinal axes, such compound movements of the mandrel being adapted to cause the winding upon each mandrel section, as it passes the cementing apparatus, of a continuous length of cemented cord and means for returning said mandrel sections and replacing them in alinement with the sections forming the mandrel.

6. An apparatus of the character described, including a cord cementing apparatus adapted to cement a continuous length of cord as it is drawn through the apparatus; a plurality of mandrels, a mandrel driving and rotating mechanism adapted to move successive mandrels past the cementing apparatus and to simultaneously rotate each mandrel about its own longitudinal axis, such compound movements of the mandrel being adapted to cause the winding upon each mandrel, as it passes the cementing apparatus, of a continuous length of cemented cord; and means adapted to act upon each mandrel after it passes the cementing apparatus to apply a sheet rubber covering to the cord cover previously wound upon the mandrel.

7. An apparatus of the character described, including a cord cementing apparatus, a mandrel driving and rotating mechanism; a plurality of mandrels adapted to be successively moved past the cementing apparatus, and each simultaneously rotated about its own longitudinal axis; means for winding helically upon each mandrel, after it passes the cementing apparatus, a sheet rubber cover; and means for automatically rendering inoperative the mandrel driving and rotating mechanism after each mandrel has received its rubber covering.

8. An apparatus of the character described, including a cord cementing apparatus, a mandrel composed of a plurality of mandrel sections, mandrel driving and rotating mechanism for simultaneously moving said mandrel sections past said cementing apparatus and rotating them about their common longitudinal axis, whereby said cord is wound about said sections, means for applying to each mandrel section after it has passed said cementing apparatus, a sheet rubber wrapping, means automatically operated by each successive mandrel section for arresting the mandrel driving and rotating mechanism after each mandrel section has received its wrapping, and means for receiving said mandrel sections and returning them to a position in which they are in alinement with the axis of said mandrel.

9. An apparatus of the character described, including a cord cementing apparatus, mandrel driving and rotating mechanism; a plurality of mandrels adapted to be successively moved past the cementing apparatus and simultaneously rotated about their own longitudinal axis; means movable longitudinally with respect to the mandrel and in an opposite direction to the movement thereof for applying a helically wound strip of sheet rubber to each mandrel after it passes the cord cementing apparatus; and means for returning the last mentioned means to initial position after the application to each mandrel of the rubber covering thereof.

10. An apparatus of the character described, including a cord cementing apparatus, mandrel driving and rotating mechanism; a plurality of mandrels adapted to be successively moved past the cementing apparatus and simultaneously rotated about their own longitudinal axis; means movable longitudinally with respect to the mandrel and in an opposite direction to the movement thereof for applying a helically wound strip of sheet rubber to each mandrel after it passes the cord cementing apparatus; means for returning the last mentioned means to initial position after the application to each mandrel of the rubber covering thereto; and means automatically operable by each successive mandrel for arresting the mandrel driving and rotating mechanism immediately upon completion of the sheet rubber covering of each mandrel.

11. An apparatus of the character described, comprising the combination of a mandrel, cord supplying means, means for operating said mandrel to wind the cord thereon, a stripping bench for receiving said mandrel, a pivoted cradle, to which said mandrel is fed, for transferring said mandrel to said stripping bench.

12. An apparatus of the character described, comprising the combination of a mandrel, cord supplying means, means for operating said mandrel to wind the cord thereon, a swinging cradle normally receiving the wound mandrel, a bench to which the mandrel may be transferred by swinging said cradle, a receiving trough communicating with said bench, for receiving the mandrel from said bench, a second trough and positively operated mechanism for transferring said mandrel from said receiving trough to said second named trough.

13. An apparatus of the character described, including a plurality of mandrels, mechanism for rotating the mandrels about their longitudinal axis, and simultaneously moving the mandrels forward through a longitudinal path and cord cementing apparatus juxtaposed to the path of the mandrels; means for maintaining a cord drawn through the cementing apparatus under tension as it is wound on to a mandrel, passing the cementing apparatus; mechanism located to receive each mandrel after it has been wound with cord; and means to return each successive mandrel to the mandrel driving apparatus after the cord covering has been removed from the mandrel.

14. An apparatus of the character described, including a mandrel driving and rotating mechanism; means for supplying a continuous length of cemented cord to a mandrel whereby a mandrel, as it is driven through the apparatus, may be covered with a helically wound cord; means for applying a sheet rubber covering to the cord covered mandrel after the mandrel has passed the cord supplying means; a stripping bench whereon the mandrel may be supported while the cord and rubber cover is removed from the mandrel; means for transferring the mandrel to the stripping bench after the rubber cover has been applied; and means for returning the stripped mandrel to the mandrel rotating and driving mechanism.

15. An apparatus of the character described, including means for supplying a continuous length of cemented cord; a mandrel driving means for moving the mandrel in a longitudinal path past the cord supplying means and for simultaneously rotating the mandrel about this longitudinal axis; an oscillatory cradle located to receive the mandrel after it has passed the cord supplying means and a stripping bench juxtaposed to the cradle and on to which the mandrel may be transferred by oscillation of the cradle.

16. An apparatus of the character described, including a mandrel, mechanism for rotating the mandrel about its longitudinal axis, and simultaneously moving the mandrel forward through a longitudinal path; a cord cementing apparatus juxtaposed to the path of the mandrel; means interposed between the cementing apparatus and the mandrel for recovering the solvent from the cord as it passes to the mandrels; and means for maintaining a cord drawn through the cementing and recovering apparatus, under tension as it is wound on to the mandrel.

17. An apparatus of the character described, comprising in combination a mandrel, means for rotating the mandrel about its longitudinal axis and simultaneously moving the mandrel forward through a longitudinal path, cord supplying means, a cord cementing apparatus in proximity to the path of said mandrel and through which the cord from said supplying means passes, whereby cemented cord is wound about said mandrel, a mandrel receiving element in the path of the mandrel, a receiving bench to which the mandrel is adapted to be transferred from said receiving element, means for returning the mandrel to its initial position including means for automatically thrusting forward said mandrel into operative position.

18. An apparatus of the character described, comprising in combination a mandrel composed of disjointedly connected sections, means for rotating said mandrel and simultaneously causing it to move forward longitudinally, means for supplying cord whereby it is wound on said mandrel, means for receiving said mandrel sections after disconnection and returning them to initial position, and means for automatically thrusting forward each section to connect same to its corresponding section.

19. An apparatus of the character described, comprising in combination a mandrel composed of disjointedly connected sections, means for rotating said mandrel and simultaneously causing it to move forward longitudinally, means for supplying cord whereby it is wound on said mandrel, means for receiving said mandrel sections after disconnection and returning them to initial position, and electro-magnetic means for automatically thrusting forward each section to connect same to its corresponding section.

20. An apparatus for producing a cord-tire fabric including in combination a mandrel provided with a helical cord-receiving groove, means for supplying cord, and means for winding cord on said mandrel and in the groove thereof.

21. An apparatus for producing a cord-tire fabric including in combination a mandrel provided with a helical cord-receiving groove, means for supplying cord, and means for winding the cord on said mandrel and in the groove thereof, said mandrel being also provided with a second relatively short helical groove of different pitch from said cord-receiving groove to facilitate the cutting of said wound cord from said mandrel.

22. An apparatus for producing a cord-tire fabric including in combination a mandrel provided with a helical cord-receiving groove, means for supplying cord, means for winding cord on said mandrel and in the groove thereof, and means for wrapping fabric about said mandrel and cord wound thereon.

23. An apparatus for producing a cord-tire fabric including in combination a mandrel provided with a helical cord-receiving groove, means for supplying cord, means for winding cord on said mandrel and in the groove thereof, and means for wrapping fabric about said mandrel and cord wound thereon, said mandrel being also provided with a second relatively short helical groove of different pitch from said cord-receiving groove to facilitate the cutting of said cord and fabric from said mandrel.

In testimony whereof I have signed my name in the presence of two subscribing witnesses.

FRANK A. SEIBERLING.

Witnesses:
RAY L. ELLSWORTH,
A. N. JOHNSON.